UNITED STATES PATENT OFFICE.

CYPRIEN MARIE TESSIÉ DU MOTAY, OF PARIS, FRANCE.

IMPROVED PROCESS FOR THE TREATMENT OF ORES.

Specification forming part of Letters Patent No. 103,434, dated May 24, 1870.

*To all whom it may concern:*

Be it known that I, CYPRIEN MARIE TESSIÉ DU MOTAY, of the city of Paris, Empire of France, have invented new and Improved Processes for the Treatment of Ores in order to extract copper therefrom; and I do hereby declare the following to be a full, clear, and exact description of the same.

The processes which form the object of the present invention are especially applicable to the treatment of the sulphurets, the arsenio-sulphurets, and the antimonio-sulphurets of copper, as well as to the refining of coppers containing iron, antimony, tin, or lead.

The processes consist, first, in roasting, in the presence of silica and oxides of iron or manganese, or of terreus and metallic silicates, the simple pyrites of copper, the double pyrites of copper and iron, as well as the antimonio-sulphurets of copper, in blast-furnaces, until the complete elimination of the sulphur or arsenic; second, in thus forming multiplied metallic silicates capable of containing the oxides of antimony, lead, or tin, but at the base the oxide of manganese and copper, which silicates, when submitted to the action of charcoal and iron, either alone or combined, in reverberatory or cupola furnaces, give up, in the metallic state, the copper, antimony, lead, or tin which they contain without the oxides of iron or manganese united to the silica being reduced; third, in obtaining alloys of copper free from sulphur and arsenic, but capable of containing antimony, tin, lead, or iron, and often several of these metals, or sometimes all of them, at the same time; fourth, in remelting, in reverberatory or cupola furnaces or in any other low-hearth furnaces, the alloys of copper produced by the above processes, in order to submit these to the action of the aerohydric or oxyhydric blow-pipes fed by pure or carbonated hydrogen, the air or oxygen being in definite proportions, so as to produce neutral flames without free oxygen; fifth, in oxidizing, by means of these blow-pipes, by the action of the neutral flames alone, metals which—such as iron, antimony, or tin—decompose water at a high temperature, when in the state of scorified oxides, from the metallic copper which the flames do not oxidize; sixth, when the alloy of copper to be treated contains lead, which, like copper, is not oxidized by neutral flames, in employing the simultaneous action of the flames and of the air from a bellows, in order to separate the copper from the lead in the same manner as silver or gold are separated from the same metal in the cupola.

The processes of roasting and the silication of the minerals of sulphureted, arsenio-sulphureted, or antimonio-sulphureted copper, as well as the process of the reduction by charcoal or iron, of the multiple silicates of copper, with a base of oxide of iron or manganese, have been and are still partly in practice, and I do not wish to include them in my present invention; but The essential features of my invention are as follows:

1. The fundamental reaction of steam, in a nascent state, produced by blow-pipes fed by air and hydrogen, or hydrogen and oxygen, upon the alloys of copper, iron, antimony, and tin, the effect of which reaction is to separate, in the metallic state, the copper which the nascent steam does not oxidize from all metals which the steam does oxidize.

2. The employment of this reaction in metallurgic furnaces in order to completely purify the copper and separate it in the metallic state from iron, antimony, or tin during the passage of these metals into the state of scorifiable oxides.

3. The alternate employment of the oxidizing reaction of the nascent steam upon iron, antimony, or tin united with the copper, and of the oxygen of the air, in order to oxidize the lead which the steam does not oxidize, when this metal becomes portion of an alloy of copper, iron, antimony, or tin.

In testimony whereof I have signed my name to this specification before two subscribing witnesses.

C. M. TESSIÉ DU MOTAY.

Witnesses:
P. GUEROULT,
C. LAFOND.